Patented June 11, 1946

2,401,776

UNITED STATES PATENT OFFICE 2,401,776

RESINOUS REACTION PRODUCTS OF POLY-HYDRIC ALCOHOLS AND ALPHA-METH-YLENE ALDEHYDES

Henry S. Rothrock, Wilmington, Del., assignor to E. I. du Pont de Nemours & Company, Wilmington, Del., a corporation of Delaware No Drawing. Application January 5, 1942, Serial No. 425,695

9 Claims. (Cl. 260—67)

This invention relates to new compositions of matter and more particularly to resinous materials and coating compositions obtained therefrom.

Resinous products have been obtained heretofore by reacting polyhydric alcohols with certain unsaturated aldehydes such as crotonaldehyde and cinnamaldehyde. The products obtained, however, do not air dry and are therefore not well suited for the manufacture of coating compositions.

This invention has as an object the production of new aldehyde-polyhydric alcohol resins which have acceptable film properties in conjunction with the property of drying. A further object resides in a method for conducting the resin-forming reaction whereby the resulting product retains sufficient reactive unsaturation to show air drying properties. A further object is the manufacture of new and useful coating compositions. Other objects will appear hereinafter.

I have discovered that when polyhydric aliphatic alcohols are condensed in the manner described hereinafter with alpha-methylene aliphatic aldehydes that resinous products which are valuable in the preparation of coating compositions, and which yield durable air drying films, are obtained.

The aldehydes used in the practice of this invention are of the type $CH_2=CRCHO$. The remaining substitution (R in the formula) on the alpha carbon atom can be hydrogen, an aliphatic group, either saturated or unsaturated, or some other inert substitution group such as an aromatic group or an ether group. Examples include, acrolein, alpha-methyl acrolein, alpha-ethyl acrolein, alpha-phenyl acrolein, alpha-ethoxyl acrolein, and the like.

The best method for carrying out the invention comprises heating an excess of an unsaturated aldehyde of the above mentioned kind containing a trace of polymerization inhibitor, such as hydroquinone, with a polyhydric alcohol, in the presence of a small amount of acid catalyst. The reaction is carried out at about 100° C. or at reflux temperature if aldehydes boiling below 100° C. are used in the reaction. After heating for several hours excess aldehyde, if present, is removed by distillation, if desired under reduced pressure. The residual product is a soft, soluble, polymeric material. To free from the acid catalyst it may be desirable to treat the polymer with bases. To this end it may conveniently be dissolved in suitable solvents and washed with alkali carbonate or bicarbonate solution. The solvent may be separated from the product by a further distillation procedure but for many applications such solutions may be used directly without additional treatment.

The invention is illustrated in further detail by the following examples in which the parts are by weight.

EXAMPLE I

*Decamethylene glycol-acrolein condensation product*

A solution of 37.8 parts of decamethylene glycol, 40 parts of acrolein (containing a trace of hydroquinone) and 0.1 part of para-toluenesulfonic acid, is refluxed over a steam bath for 1.5 hours. The excess acrolein is removed by distillation at steam bath temperature, using reduced pressure (15 mm. mercury) to remove the final traces of acrolein. The residual product is 56.8 parts. The product is dissolved in 160 parts of solvent mixture comprising 66% by weight of Hi-flash naphtha and 34% of toluene, and the solution is washed with aqueous 5% sodium carbonate solution, followed by drying over anhydrous sodium carbonate.

Flow-outs of the solution gave films which dried tack-free in about 15 minutes and, in the presence of metallic driers, became insoluble on air drying for 24 hours. Such films showed good toughness, adhesion, and hardness.

EXAMPLE II

*Hexamethylene glycol-acrolein condensation product*

To 20 parts of acrolein, stabilized with a trace of hydroquinone, is added 20 parts of hexamethylene glycol and 0.1 part of para-toluenesulfonic acid. The solution is refluxed on a steam bath for about 3.5 hours and the excess acrolein is then removed by warming under reduced pressure. The residual product comprises 36 parts. It is dissolved in a warm solvent mixture comprising 92 parts of Hi-flash naphtha and 46 parts of toluene. The hot solution is shaken with finely powdered sodium bicarbonate to remove the acid catalyst and it is then filtered while still warm. On cooling the solution sets to a firm but fragile gel, but on warming the product again is liquefied. More dilute solutions of the product do not show gelation. When dilute solutions of the product containing cobalt naphthenate drier (0.03% of cobalt based on resin) are allowed to evaporate, films showing good adhesion, toughness, and hardness are obtained.

Such films become insoluble when thoroughly dry.

EXAMPLE III

*Castor oil-acrolein condensation product*

To 90 parts of No. 1 grade castor oil is added 50 parts of acrolein stabilized with a trace of hydroquinone, and 0.2 part of para-toluenesulfonic acid. The mixture is heated at mild reflux for about 4.5 hours and the excess acrolein is then removed by warming under reduced pressure. A highly viscous, sticky, resinous product remains. The yield is 103.2 parts. The product is dissolved with warming and stirring in a mixture of 80 parts of toluene and 20 parts of ethanol. The solution obtained is shaken well with 2 parts of finely powdered sodium bicarbonate and filtered. Films obtained from evaporation of the above solution, in the presence of cobalt naphthenate drier (0.05% cobalt based on resin), dry essentially tack-free on exposure to air at room temperature for 16 hours, or on baking at 100° C. for about one hour. The films show good hardness and toughness and may be used as coating or cementing materials.

EXAMPLE IV

*Pentaerythritol-acrolein condensation product*

To 27.2 parts of pentaerythritol is added 42 parts of acrolein stabilized with a trace of hydroquinone, and 0.1 part of para-toluenesulfonic acid. The mixture is heated at 90°–100° C. for 16 hours and the excess acrolein is then removed by warming under reduced pressure. The product is dissolved in an equal weight of a mixture of 80% toluene and 20% ethanol. Films of the product obtained by evaporation of the solution on steel test plates, dry slowly at room temperature in the presence of cobalt naphthenate drier (0.03% cobalt based on resin). after making at 100° C. for one-half hour, the films are tack-free.

EXAMPLE V

*Sorbitol-alpha-methyl-acrolein condensation product*

To 9.1 parts of sorbitol is added 22 parts of stabilized alpha-methyl-acrolein and 0.1 part of para-toluenesulfonic acid. The mixture is heated at 90°–100° C., under a reflux condenser, for about 3 hours and the excess alpha-methylacrolein is then removed by distillation under reduced pressure. About 12.5 parts of highly viscous, resinous product remains and is dissolved in a solvent mixture comprising 8 parts toluene, 2 parts ethanol and 2.5 parts butanol. Films of the product obtained by evaporation of flow-outs of the solution on test plates dry well in the presence of cobalt naphthenate drier. Such films are essentially tack-free after standing at room temperature for 16 hours.

EXAMPLE VI

*Decamethylene glycol-acrolein condensation with solvent added during the reaction*

To 17.4 parts of decamethylene glycol is added 5.6 parts of acrolein stabilized with a trace of hydroquinone, and 0.1 part of para-toluenesulfonic acid. The mixture is warmed under a reflux condenser until the acrolein shows only slow refluxing. Portions of Hi-flash naphtha are then added from time to time to the reaction mixture. After heating at 90°–100° C. for about 2 hours the trace of residual acrolein and a portion of the solvent are distilled. The warm solution which contains about 50% polymeric product is shaken well with finely powdered sodium bicarbonate to remove the acid catalyst and is then filtered hot. Films of the product are practically identical with those obtained from the product described in Example I.

The polyhydric alcohols used in the operation of the invention contain at least two aliphatic alcohol groups wherein the hydroxyl groups are each attached to carbon carrying at least one hydrogen atom. Tertiary alcohol groups may be present but they react only slowly or not at all. Particularly good results are obtained with polyhydric alcohols in which the hydroxyl groups are separated by a chain of at least four carbons and preferably six or more carbon atoms as illustrated in certain of the examples given. In the case of dihydric alcohols. such as the polymethylene glycols, it is particularly desirable to have such a carbon chain separating the two hydroxyl groups. Among the polyhydric alcohols of the above types which may be employed are the following: Tetramethylene glycol, octadecanediol-1,12, octamethylene glycol, diethylene glycol, glycerol, linseed oil monoglyceride, soya bean oil monoglyceride, coconut oil monoglyceride, sorbitol, mannitol pentaerythritol, xylose and glucose.

A substantial excess of aldehyde over the amount which enters the reaction can be used, especially if the excess aldehyde can be conveniently removed from the product at the end of the reaction by simple procedures, such as distillation. This excess facilitates the reaction. If high-boiling aldehydes are used, distillation of the excess is less practical and a lesser proportion of the aldehyde is employed. Wherever the product of the reaction tends to become highly viscous during the reaction, or to form a gel, this can generally be prevented by the addition of suitable amounts of inert solvents during the course of the reaction. The amount of aldehyde which enters the reaction varies widely with the reaction conditions and the reagents used. The proper amount to use for each set of conditions should be determined by experiment.

The aldehydes employed in this invention, such as acrolein and methacrolein, which polymerize readily in pure form, should be stabilized by the addition of antioxidants or polymerization inhibitors such as pyrogallol, hydroquinone, pyrocatechol, cuprous chloride, and the like. Such inhibitors tend to prevent the aldehyde from excessive self-polymerization and thus forming non-homogeneous products.

The reaction under preferred conditions is usually carried out at 50° to 125° C. using a reflux condenser if required. High temperatures, for example, 150°–200° C., usually cause rapid polymerization and gelation so that insoluble products result unless especial care is taken. On the other hand, temperatures below 50° C. give only a slow rate of reaction. When the reaction is essentially completed it is desirable, as mentioned before, to distil off any excess residual aldehyde; however, excessive heating during this step should be avoided so that the product is not polymerized to an insoluble state. In many cases the application of reduced pressure will facilitate this distillation so that the last traces of the free aldehyde may readily be removed from the product.

Acid catalysts are used to promote the reaction. Organic catalysts such as benzene sulfonic acid, p-toluenesulfonic acid and camphorsulfonic acid are preferred. In certain cases various other catalysts capable of maintaining an acid reaction media may be used, such as methyl acid sulfate, boron fluoride, hydrogen chloride, sodium acid sulfate, ferric chloride, monosodium phosphate, acetic acid, propionic acid, sulfamic acid, phosphoric acid and the like.

The products of this invention are useful as coating compositions which may be air dried or baked. Such products are also useful for making impregnated fabrics, coated fabrics, patent leather, linoleum, impregnated paper, and the like.

Other products may be used as adhesives, waxes and plasticizers. The products may be used as modifying agents for natural or synthetic resins such as rosin ester gum, copal, Kauri, phenol-formaldehyde resins, urea-formaldehyde resins, polyvinyl acetate, polyvinyl chloride, ethyl cellulose, nitrocellulose, cellulose acetate and the like. The products may be incorporated into coating and molding compositions which may include various components such as solvents, pigments, plasticizers, waxes, resins, as needed and desired.

As many apparently widely different embodiments of this invention may be made without departing from the spirit and scope thereof, it is to be understood that I do not limit myself to the specific embodiments thereof except as defined in the appended claims.

I claim:

1. A resinous product which yields air drying films and which comprises the reaction product obtained by heating at a temperature of 50° C. to 125° C., in the presence of an acid catalyst and a polymerization inhibitor reactants consisting of an acyclic polyhydric aliphatic alcohol containing not more than six hydroxyl groups, two of which are separated by a chain of at least four carbon atoms, and an aldehyde of the formula $CH_2=CRCHO$ in which R is a substituent selected from the group consisting of hydrogen, alkyl, aryl and alkoxy groups.

2. The resinous product set forth in claim 1 in which said polyhydric aliphatic alcohol is a polymethylene glycol, said aldehyde being of the formula $CH_2=CRCHO$ in which R is a substituent selected from the group consisting of hydrogen, alkyl, aryl, and alkoxy groups.

3. The process set forth in claim 4 in which said polyhydric aliphatic alcohol is a polymethylene glycol.

4. A process for preparing polymers which yields air drying films and which comprises heating at a temperature of 50° C. to 125° C. in contact with an acid catalyst and a polymerization inhibitor reactants consisting of acrolein and an acyclic polyhydric aliphatic alcohol containing not more than six hydroxyl groups, two of which are separated by a chain of at least four carbon atoms.

5. The resinous product set forth in claim 1 in which R is an alkyl group.

6. The resinous product set forth in claim 1 in which R is an aryl group.

7. The resinous product set forth in claim 1 in which said aldehyde is acrolein.

8. A resinous product which yields air drying films and which comprises the reaction product obtained by heating at a temperature of 50° C. to 125° C. in the presence of an acid catalyst and a polymerization inhibitor, reactants consisting of hexamethylene glycol and acrolein.

9. A process for preparing polymers which yields air drying films and which comprises heating at a temperature of 50° C. to 125° C., in contact with an acid catalyst and a polymerization inhibitor, reactants consisting of hexamethylene glycol and acrolein.

HENRY S. ROTHROCK.